(12) United States Patent
Kennedy (10) Patent No.: US 8,423,395 B1
(45) Date of Patent: Apr. 16, 2013

(54) SYSTEM AND METHOD FOR MANAGING DATA ASSOCIATED WITH AVAILABLE TO-PROMISE (ATP) PRODUCTS

(75) Inventor: Brian M. Kennedy, Coppell, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

(21) Appl. No.: 09/510,607

(22) Filed: Feb. 22, 2000

Related U.S. Application Data (63) Continuation of application No. 08/491,167, filed on Jun. 16, 1995, now Pat. No. 6,188,989.

(51) Int. Cl.
*G06Q 10/00* (2012.01)

(52) U.S. Cl.
USPC .................................................. 705/7.25

(58) Field of Classification Search ............... 705/2–4, 705/26, 7–8, 22, 28
See application file for complete search history.

(56) References Cited

U.S. PATENT DOCUMENTS

| | | | |
|---|---|---|---|
| 4,209,845 A | 6/1980 | Berger et al. | 707/7 |
| 4,611,280 A | 9/1986 | Linderman | 712/300 |
| 4,611,310 A | 9/1986 | Durbin | 365/230.01 |
| 4,737,910 A | 4/1988 | Kimbrow | 705/28 |
| 4,827,423 A | 5/1989 | Beasley et al. | 700/46 |
| 4,972,318 A | 11/1990 | Brown et al. | |
| 4,992,940 A | 2/1991 | Dworkin | 364/401 |
| 5,041,972 A | 8/1991 | Frost | 364/401 |
| 5,089,970 A | 2/1992 | Lee et al. | 700/96 |
| 5,101,352 A | 3/1992 | Rembert | 705/8 |
| 5,128,861 A | 7/1992 | Kagami et al. | 705/10 |
| 5,148,370 A | 9/1992 | Litt et al. | 700/104 |
| 5,175,857 A | 12/1992 | Inoue | 707/7 |
| 5,216,612 A | 6/1993 | Cornett et al. | 700/96 |
| 5,218,700 A | 6/1993 | Beechick | 712/300 |
| 5,233,533 A | 8/1993 | Edstrom et al. | 700/103 |
| 5,237,496 A | 8/1993 | Kagami et al. | 364/401 |
| 5,280,425 A | 1/1994 | Hogge | 712/300 |

(Continued)

FOREIGN PATENT DOCUMENTS

| | | |
|---|---|---|
| EP | 0425405 A2 | 8/1880 |
| EP | 0231552 A1 | 8/1987 |

(Continued)

OTHER PUBLICATIONS

Greene et al., "MRP II:Out with the Old . . . ; Available: Real-Time EDI, Multiplant Functions, More, MRP II Software Systems; How to Negotiate the Right Price", Computerworld, Jun. 8, 1992, vol. 26, No. 23, pp. 73.*

(Continued)

*Primary Examiner* — John Pauls (74) *Attorney, Agent, or Firm* — Jackson White, PC; Steven J. Laureanti (57) ABSTRACT

A software system for managing available to promise and making promises to fulfill customer requests is provided. The software system includes a supply chain model representing a chain of supply. The supply chain model includes site models that represent sites having capacity and that manage material flow. The supply chain model also includes seller models that represent sellers and that manage forecasting and purchasing. Commitments between sites is modeled by requests and promises, and the sellers can post requests on behalf of sites in anticipation of future requests from the sites.

32 Claims, 2 Drawing Sheets

U.S. PATENT DOCUMENTS

| | | | | |
|---|---|---|---|---|
| 5,303,144 | A | 4/1994 | Kawashima et al. | 705/8 |
| 5,305,199 | A | 4/1994 | LoBiondo et al. | 364/403 |
| 5,311,424 | A | 5/1994 | Mukherjee et al. | |
| 5,321,833 | A | 6/1994 | Chang et al. | 395/600 |
| 5,343,388 | A | 8/1994 | Wedelin | 364/402 |
| 5,369,570 | A | 11/1994 | Parad | 705/8 |
| 5,440,479 | A | 8/1995 | Hutton | 364/401 |
| 5,450,317 | A | 9/1995 | Lu et al. | |
| 5,459,656 | A * | 10/1995 | Fields et al. | 705/7 |
| 5,570,291 | A | 10/1996 | Dudle et al. | 364/268.01 |
| 5,594,639 | A * | 1/1997 | Atsumi | 700/107 |
| 5,630,070 | A * | 5/1997 | Dietrich et al. | 705/8 |
| 5,712,985 | A * | 1/1998 | Lee et al. | 705/7 |
| 5,712,989 | A | 1/1998 | Johnson et al. | 705/28 |
| 5,715,444 | A | 2/1998 | Danish et al. | 395/604 |
| 5,727,164 | A * | 3/1998 | Kaye et al. | 705/28 |
| 5,734,890 | A | 3/1998 | Case et al. | |
| 5,758,329 | A | 5/1998 | Wojcik et al. | 705/28 |
| 5,765,143 | A | 6/1998 | Sheldon et al. | 705/28 |
| 5,809,144 | A | 9/1998 | Sirbu et al. | 380/25 |
| 5,826,260 | A | 10/1998 | Byrd, Jr. et al. | 707/5 |
| 5,845,258 | A | 12/1998 | Kennedy | 705/8 |
| 5,854,746 | A | 12/1998 | Yamamoto et al. | |
| 5,873,076 | A | 2/1999 | Barr et al. | 707/3 |
| 5,918,213 | A | 6/1999 | Bernard et al. | 705/26 |
| 5,946,210 | A | 8/1999 | Montminy et al. | 364/468.03 |
| 5,960,414 | A | 9/1999 | Rand et al. | 705/28 |
| 5,963,920 | A | 10/1999 | Rose et al. | 705/28 |
| 5,963,953 | A | 10/1999 | Cram et al. | 707/102 |
| 5,970,474 | A | 10/1999 | LeRoy et al. | 705/27 |
| 5,979,757 | A | 11/1999 | Tracy et al. | 235/383 |
| 5,995,947 | A | 11/1999 | Fraser et al. | 705/38 |
| 5,999,908 | A | 12/1999 | Abelow | 705/1 |
| 6,009,406 | A | 12/1999 | Nick | 705/10 |
| 6,009,407 | A | 12/1999 | Garg | 705/10 |
| 6,012,041 | A | 1/2000 | Brewer et al. | 705/28 |
| 6,012,051 | A | 1/2000 | Sammon, Jr. et al. | 706/52 |
| 6,016,504 | A | 1/2000 | Arnold et al. | 709/200 |
| 6,035,305 | A | 3/2000 | Strevey et al. | 707/104 |
| 6,049,777 | A | 4/2000 | Sheena et al. | 705/10 |
| 6,055,519 | A | 4/2000 | Kennedy et al. | 705/80 |
| 6,064,980 | A | 5/2000 | Jacobi et al. | 705/26 |
| 6,085,165 | A | 7/2000 | Ulwick | 705/7 |
| 6,085,170 | A | 7/2000 | Tsukuda | 705/26 |
| 6,167,380 | A | 12/2000 | Kennedy et al. | 705/10 |
| 6,167,383 | A | 12/2000 | Henson | 705/26 |
| 6,188,989 | B1 * | 2/2001 | Kennedy | 705/8 |
| 6,195,652 | B1 | 2/2001 | Fish | 707/2 |
| 6,226,652 | B1 | 5/2001 | Percival | 707/203 |
| 6,249,774 | B1 | 6/2001 | Roden et al. | 705/28 |
| 6,321,133 | B1 | 11/2001 | Smirnov et al. | 700/100 |
| 6,324,522 | B2 | 11/2001 | Peterson et al. | 705/28 |
| 6,405,308 | B1 | 6/2002 | Gupta et al. | 713/1 |
| 6,463,345 | B1 | 10/2002 | Peachy-Kountz et al. | 700/99 |
| 6,484,165 | B1 | 11/2002 | Beall et al. | 707/3 |
| 6,505,172 | B1 | 1/2003 | Johnson et al. | 705/27 |
| 6,519,648 | B1 | 2/2003 | Eyal | 709/231 |
| 6,567,820 | B1 | 5/2003 | Scheifler et al. | 707/103 |
| 6,601,043 | B1 | 7/2003 | Purcell | 705/26 |
| 7,039,602 | B1 | 5/2006 | Kapadia et al. | |
| 7,085,729 | B1 | 8/2006 | Kennedy et al. | |
| 2001/0044769 | A1 | 11/2001 | Chavez | 705/37 |
| 2001/0047285 | A1 | 11/2001 | Borders | 705/8 |
| 2002/0013721 | A1 | 1/2002 | Dabbiere et al. | 705/7 |
| 2002/0019761 | A1 | 2/2002 | Lidlow | 705/10 |
| 2002/0029168 | A1 | 3/2002 | McConnell, Jr. et al. | 705/26 |
| 2002/0049622 | A1 | 4/2002 | Lettich et al. | 705/7 |
| 2002/0082931 | A1 | 6/2002 | Siegel et al. | 705/26 |

FOREIGN PATENT DOCUMENTS

| | | |
|---|---|---|
| EP | 025405 A | 8/1990 |
| EP | 0425405 A * | 5/1991 |
| EP | 0425405 A2 * | 5/1991 |
| EP | 0458284 | 11/1991 |
| EP | 0463616 A2 | 1/1992 |
| EP | 0466089 A2 | 1/1992 |
| EP | 0466090 A2 | 1/1992 |
| EP | 0615198 | 9/1994 |
| GB | 2293902 | 4/1996 |
| WO | WO 00/17795 | 3/2000 |

OTHER PUBLICATIONS

Hammel et al., "Tightening the supply chain", Production and inventory Management Journal, Jun. 1993, vol. 34, No. 2, pp. 63.*

Davis, Donald, "Tough Customers", Manufacturing Systems, Nov. 1994, p. 16.*

Dialog File 635 (Business Dateline), No. 145792, Smith et al., "Dun & Bradstreet Software Delivers Sales and Promotion System to Manufacturers", Business Wire, Jun. 11, 1990, 3 pages.*

Rhodes, Dusty, "The keys to the entrprise: integrtaed applications drive information systems to new horizons—enterprise-wide integration", HP Professional, Nov. 1991, vol. 5, No. 11, pp. 44.*

Anonymous, "Intelligent Manufacturing report", Intelligent Manufacturing, Mar. 1995, vol. 1, No. 3, 3 pages.*

Anonymous, Dialog file 621 (Gale Group New Prod. Annou. (R)), No. 1007808, "New Para Research MRP II System Adapts Itself to your Business", PR Newswire, Aug. 13, 1985, 4 pages.*

Oliver, Morton, "The uses of time", The Economist, Mar. 5, 1994, vol. 330, No. 7853, p. S15.*

Parker, Kevin, "What new tools will best tame time?", Manufacturing Systems, Jan. 1994, vol. 12, No. 1, p. 16.*

Jasany, Leslie C., "Cut Costs with Integrated Software", Automation, Oct. 1987, vol. 34, No. 10, p. 62 (abstract).*

Dusty Rhodes, The keys to the enterprise: integrated applications drive information systems to new horizons, HP Professional, vol. 5, No. 11, pp. 44-47 (Nov. 1991).*

Marilyn K,. McClelland, "Using Simulation to Facilitate Analysis of Manufacturing Strategy", Journal of Business Logistics, vol. 13, No. 1, pp. 215-237, 1992.

Dusty Rhodes, "The Kekys to the Enterprise: Integrated Applications Drive Information Systems to New Horizons," HP Professional, vol. 5, No. 11, pp. 44-46, Nov. 1991.

David M. McClutheon, et al., "The Customization-Responsiveness Squeeze," Sloan Management Reveiw, vol. 35, No. 2, pp. 89-99, Wint. 94.

Smith, F., et al., "Dun & Bradstreet Software Delivers Sales and Promotion System to Manufacturers," Business Wire; s1, p. 1, Jun. 11, 1990.

Castagna, R., et al., "A Model for Evaluating Manufacturing System Time Performances," Integrated Manufacturing Systems, v 3, n 3, pp. 15-21, 1992.

Foxlow, T.; "Knowledge-Based Manufacturing: The Key to Recovery," Logistics Information Management, v 7, n 4, pp. 23-26, 1994.

Parker, K., "Demand Management and Beyond," Manufacturing Systems Supply-Chain Strategies: Forecasting and Demand Management Supplement, pp. 2A-14A, Jun. 1996.

Anonymous, Dialog File 148, No. 8283166, Concentra and i2 Technologies to integrate sales configuration with global supply chain management; Product configuration recognized as critical link in intelligent global supply chain management, Business Wire, 2 pages, Oct. 10, 1995.

Anonymous, MRP upstaged (One trend in the software industry is that the top enterprise-resource-planning software companies are outright supplanting the core planning functions of their manufacturing-resource planning (MRP II) systems or are augmenting them with new scheduling software that provides real-time decision support), Industry Week, v. 246, n. 3, 4 pages, Feb. 3, 1997.

Notification of Transmittal of International Preliminary Examination Report, Oct. 24, 2000.

PCT Notification of Transmittal of the International Search Report or the Declaration, 4 pages, May 12, 2001.

R. Castagna, et al., "A Model for Evaluating Manufacturing System Time Performances," Integrated Manufacturing Systems, v. 3, n. 3, 11 pages, 1992.

B.M. Kennedy, et al., "System and Method for Managing ATP," U.S. Appl. No. 09/504,247, pending, Feb. 15, 2000.

A.C. Kapadia, et al., "System and Method for Promising Delivery of Configured Products with Selected Optimization," U.S. Appl. No. 09/333,894, pending, Jun. 14, 1999.

A.C. Kapadia, et al., "System and Method for Promising Delivery of Configured Products," U.S. Appl. No. 09/333,895, pending, Jun. 14, 1999.

Unknown, "Rhythm," a series of i2 Technologies' web pages, http://web.archive.org/web/19980526040159/http://www.i2.com/, 23 pages, Apr. 23, 1998.

Allen, Supply Chain Management Software, May 1998, University of Texas, Austin http://esallen.home.mindspring.com/erp.SCH.htm, May 1998.

Available to Promise (ATP) http://sandbox.aiss.uiuc.edu/oracle/nca/mrp.atp.htm.

carmax.com, webpages dated prior to Mar. 2, 2001 retrieved from archive.org, 10 pages.

Funaki, et al., "Method and System for Production Planning Transaction," JP02001331693A, EAST Version 1.03.0002, 58 pages, Apr. 9, 2002.

Parker, What New Tools will Best Save Time, Manufacturing Systems, Wheaton, vol. 12, Issue 1, 6 Pages, Nov. 1991.

SAP Annual Report—1998, SAP Ag. http://www.sap-ag.de/company/investor/reports/ar_onlin/1998/init_e.asp, 1998.

Rhythm 2 Project Plans.

Tech Staff Plan 2_7, Jun. 16, 1994.

Benchmarking Partners, Accessing i2 Technologies' Rhythm, 1994.

i2 Technologies, Inc. Planning and Scheduling by any other Name is Guesswork, 1994.

Intellection, Inc. Intellection, Inc. is now i2 Technologies, Inc. New Release Mar. 1, 1994.

Intellection, Inc. Searching the World for the Best Planning and Scheduling Solution?

Intellection, Inc. Rhythm Intelligent Planning and Scheduling Systems, Feb. 1994.

Intellection, Inc. Rhythm Intelligent Planning and Scheduling Systems.

i2 Technologies, Inc. Tech Staff Plan, Apr. 8, 1993.

Industrial Engineering, Scheduling Software, p. 45, Dec. 1991.

i2 Technologies, Inc., "Rhythm Intelligent Planning & Scheduling Systems—User's Manual (Master Production Planner & Scheduler)", Feb. 7, 1994, Version 2.5, USA.

i2 Technologies, Inc., "Rhythm Intelligent Planning & Scheduling Systems—Tutorial Manual (Master Production Planner & Scheduler)", Feb. 24, 1994, Version 2.5, USA.

i2 Technologies, Inc., "Rhythm Intelligent Planning & Scheduling Systems—Reference Manual", Apr. 6, 1995, Version 2.7, USA.

i2 Technologies, Inc., "Rhythm Intelligent Planning & Scheduling Systems—User's Manual", Apr. 6, 1995, Version 2.7, USA.

i2 Technologies, Inc., "Rhythm Intelligent Planning & Scheduling Systems—Interplant Manual", Jan. 19, 1995, USA.

Fogarty, Donald W. et al., "Production and Inventory Management," 1983.

Brown, Robert G., "Materials Management, A Modular Library," 1977.

Martin, Andre J., "DRP in Nonmanufacturing Environments: Retailers, Wholesalers and Distributors," Distribution Resource Planning; Distribution Management's Most Powerful.

SAP AG, "RV System Screen Procedures Master Data,"Functional Documentation V04.2/1, Jan. 1, 1994.

Deis, Paul, Production & Inventory Management in the Technological Age, 1983.

LaBella, John C., et al., "Logistics Planning with Customer Demand Factors," 30th Annual International Conference Proceedings, 1987.

i2 Technologies, Inc., "Rhythm Intelligent Planning & Scheduling Systems—Rhythm Factory Planner Reference Manual", Dec. 9, 1996, USA.

i2 Technologies, Inc., "Rhythm Intelligent Planning & Scheduling Systems-User's Manual (Master Production Planner & Scheduler)", Mar. 13, 1996, Version 2.8, USA.

i2 Technologies, Inc., "Rhythm Intelligent Planning & Scheduling Systems—Tutorial Manual (Master Production Planner & Scheduler)", Jan. 26, 1995, Version 2.7, USA.

i2 Technologies, Inc., "Rhythm Intelligent Planning & Scheduling Systems—Tutorial Manual", Jan. 31, 1996, Version 2.8, USA.

i2 Technologies, Inc., "Rhythm Intelligent Planning & Scheduling Systems—Rhythm Factory Planner User's Manual", Dec. 9, 1996, Version 2.9, USA.

i2 Technologies, Inc., "Rhythm Intelligent Planning & Scheduling Systems—Interplant Manual", Mar. 30, 1994, Version 2.5, USA.

Eppen, Gary et al., "Centralized Ordering Policies in a Multi-Warehouse System with Lead Times and Random Demand," Multi-Level Production/Inventory Control Systems: Theory and.

Brown, Robert G., "Decision Rules for Inventory Management," 1967.

Wight, Oliver W., "MRP II: Unlocking America's Productivity Potential", 1981.

Mosesian, Harry J. et al., "DRP: A Planning Tool . . . And Much More," APICS International Conference Proceedings, 1988.

Beversluis, Stephen W. et al., "Using a Spreadsheet for Capacity Planning and Scheduling," Production and Inventory Management Journal, 1995.

Gopal, Christopher et al., "Information Technology and Integrated Distribution," Integrated Distribution Management, 1993.

Ormsby, Joseph G. et al., "The Role of Marketing in Material Requirements Planning Systems," Industrial Marketing Management, 1991, vol. 20, No. 1.

Monden, Yasuhiro, Toyota Production System: Practical Approach to Production Management, 1983.

Vollmann, Thomas E. et al., "Manufacturing Planning and Control Systems," 1984.

Swaminathan, Jayashankar M. et al., "Modeling the Dynamics of Supply Chains," 1995.

Perry, Daphne et al., "Imagineering the Future of Continuous Replenishment in the Food Industry: A Canadian Perspective," American Production and Inventory Control System, 1995.

SAP AG, "Sales SD 030," R/3 System, Release 2.2, Oct. 1994.

Kurt Salmon Associates, Inc., "Efficient Replenishment," Efficient Consumer Response, Enhancing Consumer Value in the Grocery Industry, 1993.

SAP AG, "RV System Course RV011 Customer Order Processing," Release 5.0, Feb. 1, 1992.

Delurgio, Stephen et al., Forecasting Systems for Operations Management, 1991.

Martin, Andre J., "Distribution Resource Planning: The Gateway to True Quick Response and Continuous Replenishment," 1993.

Clay, Peter, "Advanced Available-to-Promise Concepts and Techniques," Reprinted from 1990 APICS Conference Proceedings, Master Planning Reprints, Revised 1993.

Coltman, John K., "Production Planning in an International Multiplant, Multiwarehouse Environment," American Production and inventory Control Society 1985 Conference Proceeding.

Campbell, Kenneth L., "From Forecast to the Master Production Schedule in a Multi-Plant; Multi-Level Product Environment," Reprinted form APICS 1984 Conference Proceedings: Rea.

Federgruen, Awi et al., "Approximations of Dynamic, Multilocation Production and Inventory Problems," Management Science, Jan. 1984, vol. 30, No. 1.

Clark, Andrew J., "An Informal Survey of Multi-Echelon Inventory Theory," Naval Research Logistics Quarterly, Dec. 1972, vol. 19, No. 4.

Topkis, Donald M., "Optimal Ordering and Rationing Policies in a Nonstationary Dynamic Inventory Model with N Demand Classes," Management Science, 1968, vol. 15, No. 3.

SAP AG, "SD Sales Guide," R/3 System, Release 2.1-2.2, Sep. 1994.

SAP AG, "SD Sales Information System," R/3 System, Release 2.0-2.2, Jul. 1994.

SAP AG, "RV System Screen Procedures Sales," Functional Documentation, Jan. 1, 1994, vol. 04.2/3.

SAP AG, SD Sales Guide, R/3 System, Release 2.0, Jul. 1993.

Martin, Andre J., "Distribution Resource Planning," Production and Inventory Control Handbook, 2d ed., 1987, pp. 22.1-22.36.

i2 Technologies, Inc. Rhythm Data Dictionary, Feb. 7, 1995.

i2 Technologies, Inc. Rhythm Intelligent Planning and Scheduling Systems MP Manual, Feb. 10, 1995.

i2 Technologies, Inc. Rhythm Intelligent Planning and Scheduling Systems User's Manual, Mar. 15, 1995.

i2 Technologies, Inc. Rhythm Intelligent Planning and Scheduling Systems Reference Manual, Mar. 15, 1995.

i2 Technologies, Inc. Rhythm Record Manual, Mar. 15, 1995.

i2 Technologies, Inc. Rhythm Intelligent Planning and Scheduling Systems Dynamic Scheduler Manual, Jun. 29, 1995.

i2 Technologies, Inc. Rhythm Intelligent Planning and Scheduling Systems MP Manual, Jan. 11, 1996.

i2 Technologies, Inc. Rhythm Intelligent Planning and Scheduling Systems Reference Manual, Jan. 30, 1996.

i2 Technologies, Inc. Rhythm Intelligent Planning and Scheduling Systems User's Manual, Feb. 5, 1996.

SAP "R/3 SD Sales Information System", Jul. 1994, Release 2.0-2.2.

SAP "RV System Course RV 011, Customer order processing", 1992.

SAP System Documentation R-2 5.0 vol. 2-3, Jan. 1994.

SAP System Documentation R-2 5.0 vol. 2-1, Jan. 1994.

* cited by examiner

SYSTEM AND METHOD FOR MANAGING DATA ASSOCIATED WITH AVAILABLE TO-PROMISE (ATP) PRODUCTS

CROSS REFERENCE TO RELATED APPLICATIONS

This application is a continuation of U.S. application Ser. No. 08/491,167, filed Jun. 16, 1995, now U.S. Pat. No. 6,188,989 by Brian M. Kennedy and entitled "SYSTEM AND METHOD FOR MANAGING ATP".

This application is related to the following applications which are incorporated by reference herein:

U.S. patent application Ser. No. 08/491,153, filed Jun. 16, 1995, and entitled EXTENSIBLE MODEL NETWORK REPRESENTATION SYSTEM FOR PROCESS PLANNING, now U.S. Pat. No. 5,764,543;

U.S. patent application Ser. No. 08/491,121, filed Jun. 16, 1995, and entitled MODEL-INDEPENDENT AND INTERACTIVE REPORT GENERATION SYSTEM AND METHOD OF OPERATION, now U.S. Pat. No. 5,832,532; and U.S. patent application Ser. No. 08/491,168, filed Jun. 16, 1995, and entitled STRATEGY DRIVEN PLANNING SYSTEM AND METHOD OF OPERATION, now U.S. Pat. No. 5,845,258.

TECHNICAL FIELD OF THE INVENTION

This invention relates in general to the fields of demand management, supply chain management, and capacity management. More particularly, the present invention relates to a system and method for managing available-to-promise (ATP) and making promises to fulfill customer requests.

BACKGROUND OF THE INVENTION

Manufacturers produce products for sale to customers. In the sales process, customers place demands on manufacturers. A customer demand may consist of a request for a particular quantity of a product by a specific date. This date and quantity information may be collectively referred to as the "customer request" or "request information".

Manufacturing and distribution facilities have limited resources (capacity) and limited inventories (materials). Therefore, every customer request may not be satisfiable in that some may receive no promise, others may receive an inadequate one. Planning and managing which customer requests to promise and fulfill, termed "demand management", is a fundamental and critical activity of most manufacturing and distribution organizations.

Due to material, capacity and other limitations, a manufacturer may not be able to meet a particular customer request. In this situation, the manufacturer typically negotiates with the customer to deliver a quantity of product by one or more dates agreeable to the customer. This date and quantity information may be referred to as the "manufacturer promise" or "promise information". Based on the manufacturer promise, the manufacturer creates operational plans to implement the promise information. Manufacturers may use a combination of diverse software tools in the negotiating and planning processes.

Traditional methods for demand management have several problems. First, such methods and systems are not integrated. Several different tools may be required to implement the entire demand management strategy. Second, such traditional systems and methods are not dynamic. Once a plan is in place, it is difficult for the manufacturer to react to changing circumstances and update the plan. Third, order promising to customers is often done based upon an infeasible plan. Later attempts to find a feasible plan that will satisfy the promises are often futile.

The environment today requires more and more responsiveness. Customers require significant product diversity and want promises to be made to their requests immediately, while on the phone. The traditional way of promising in configure-to-order or make-to-order environments involves submitting the request to the planners and then, a few days or weeks later, after the planners have gone through a planning cycle, receiving a promise or rejection.

Many manufacturing and distribution organizations have several sales offices associated with each manufacturing factory. Each sales office independently promises to supply products from the factory to customers. This is referred to as a "distributed organization". Each sales person in each of the sales organizations needs to be able to make instantaneous promises, simultaneously with other sales people doing the same. In addition, each of those promises need to be fulfillable by a feasible plan.

To better meet customer demand, the manufacturer must build product and/or intermediate items before receiving customer orders. This production is based on projections called "forecast orders". A product produced based on these forecast orders is referred to as "available to promise" or "ATP". ATP consists of quantities of products with associated dates that the products are scheduled to be available for delivery to the customer.

In distributed organizations a sales office may need approval from the factory before ATP may be promised to meet a customer request. This approval process may take up to a week under current practices. This delay is unacceptable in today's business environment.

SUMMARY OF THE INVENTION

In accordance with the present invention, a system and method for managing ATP is provided that substantially eliminate or reduce disadvantages and problems associated with previously developed systems and methods.

More particularly, one embodiment the present invention provides a method for managing ATP in a distributed organization. The distributed organization comprises at least one supplying facility such as a factory. Additionally, the distributed organization comprises a plurality of requesting facilities for each supplying facility. The requesting facilities may comprise, for example, sales offices. The requesting facilities and the supplying facilities may be coupled by a computer network.

In this embodiment, the requesting facilities each store forecast orders in a memory of a computer at the requesting facility. The forecast orders include request information. As defined previously, the request information includes the quantity (or range of quantities) of product requested from the supplying facility and the date (or range of dates) it is needed. A master scheduling software system may be used to selectively plan use of, for example, manufacturing capacity of the supplying facility to meet selected forecast orders based on predetermined criteria. If a feasible and desirable plan can be devised that satisfies the request, then the supplier may make a promise to the customer that the supplier will satisfy the request. The promises to meet the selected forecast orders may be transmitted directly to the customers over a computer network.

In environments where customers are not willing to wait for a plan to be developed to get a promise, the supplying facility must create promises in advance that are available for immediate transfer to a customer. In this embodiment, future requests can be forecasted and a plan can be made to satisfy and promise those forecast requests. When an actual customer request is received, one or more (or a portion of) promises made to forecast requests may be instantly reassigned to the customer request.

A technical advantage of the present invention includes the ability in a distributed organization with distributed sales people to allocate some of the promises made to forecast requests to certain sales people, thereby preventing them from simultaneously using the same forecast promise as a promise to a customer, without requiring them to check with each other before making promises. In this embodiment, each sales organization or person can be modeled and each forecast request/promise can be allocated to one such sales entity.

Another technical advantage of the present invention is that the allocation of promises may also be done for business management reasons. For example, a sales organization may be allocated promises based upon how much they are willing to commit to selling. This embodiment allows each sales entity to create its own forecast of what it could sell and establish the level it is willing to commit to selling. Forecast requests are then generated from the committed levels. Promises made to those requests become allocated to that sales entity for it to use to form promises for customer requests.

A further technical advantage of the present invention is that it allows these sales entities to be organized into hierarchies (for example, sales person within sales office within marketing organization). Promises that are allocated to a sales organization can be used by the sales people within that organization. Coordination is required in such cases to ensure that two sales people do not consume the same promises. But where such coordination is feasible, it is typically desirable to have some allocations that are common among them.

Another technical advantage of the present invention is that customer requests that cannot currently be promised can be queued. As conditions change, the queued requests have the first opportunity to be promised. Without such a queuing mechanism, requests that cannot be promised are forgotten. When new capacity frees, the next customer that happens to make a request gets that newly freed capacity.

An additional technical advantage of the present invention is that an entire distributed organization of suppliers and customers can be modeled along with the requests and promises placed between them. In this way, planners can view, manage, and plan the activity of a whole network where the interfaces between elements must be formal (separate corporations).

Another technical advantage of the present invention is that each sales entity can define the "products" it sells, where a product is an item priced based on the item, the quantity, the order lead time (time from accepting the order to the requested due date), and the customer. For each such product, an independent forecast and commitment can be made, independent forecast requests can be issued, and independent promises can be received. In this way, promises can be allocated for requests with particular characteristics. For example, one product may sell an item for $5 if the order lead time is greater than 6 weeks. Another product may sell the same item for $10 but with as short as 1 week lead time. Thus, a customer request with 6 week order lead time may be received when all allocations for that product have been consumed. However, if all the allocations for the 1 week order lead time product have not been consumed, then the customer can be given an option: the next available promise for the 6 week order lead time product would be 2 weeks later than your due date, or alternatively you may choose to pay $10 for the 1 week order lead time product and to receive it on time. Such management of products can prevent higher future profits for being sold at lower profits because they are promised first-come-first-served.

A further technical advantage of the present invention is that the forecast requests can specify how they expire. Some may shift out in time if they are not consumed; others may expire and disappear if not consumed. Such auto-maintenance of forecast requests can be very valuable in maintaining accurate forecasts and allocations for hundreds or thousands of products.

BRIEF DESCRIPTION OF THE DRAWINGS

A more complete understanding of the present invention and the advantages thereof may be obtained by reference to the following description taken in conjunction with the accompanying drawings in which like reference numbers indicate like features, and wherein.

DETAILED DESCRIPTION OF THE INVENTION

The Supply Chain, Site, and Seller Models

Figure 1:
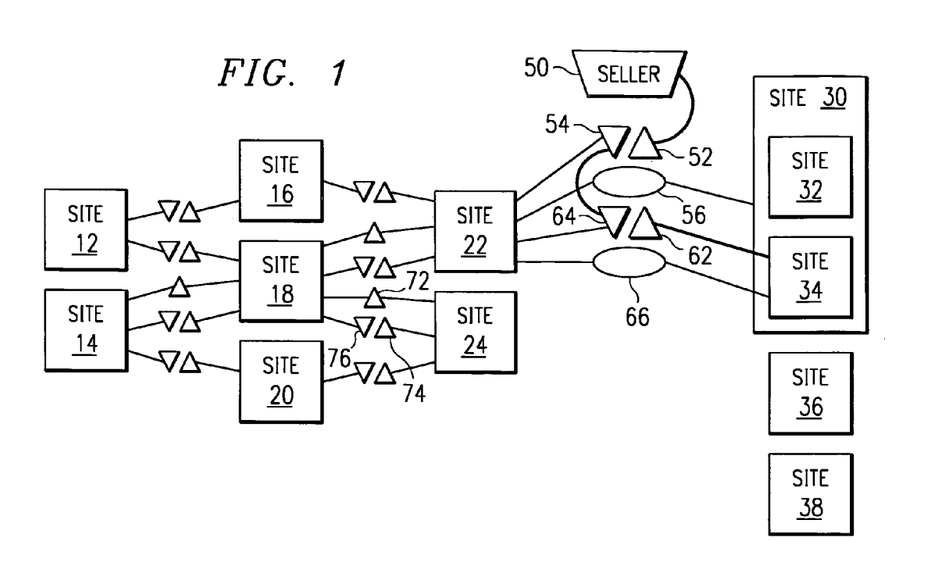
FIG. 1 is a block diagram of one embodiment of a supply chain model, including site models and seller models, and requests and promises between them.

FIG. 1 is a block diagram of one embodiment of a supply chain model, including site models and seller models, and requests and promises between them. FIG. 1 provides an example supply chain according to the teachings of the present invention. The supply chain model of FIG. 1 comprises twelve site models, 12, 14, 16, 18, 20, 22, 24, 30, 32, 34, 36, and 38. These site models represent organizational units that may have the capacity and materials to produce or consume items. Each site can place requests for items upon other sites. Requests are in general indicated in FIG. 1 by triangles 52, 62, 72, and 74. For each request 52, 62, 72, and 74, the site 12, 14, 16, 18, 20, 22, 24, 30, 32, 34, 36, or 38 being requested can make a promise to fulfill (wholly or partially) that request. Promises are in general indicated by inverted triangles 54, 64, and 76.

Other primary members of a supply chain model are seller models. The embodiment of a supply chain of FIG. 1 consists of a single seller model 50. The seller model 50 is partially depicted in FIG. 2 and consists of a list of products 110 that seller 50 offers for sale. A product model 110 defines the supplier site, the item at that site, a minimum order lead time, a minimum quantity, and the allowed customer sites. If a customer request fits those criteria of a product, then that request is eligible to be filled by that product, at the pricing specified by that product.

Figure 2:
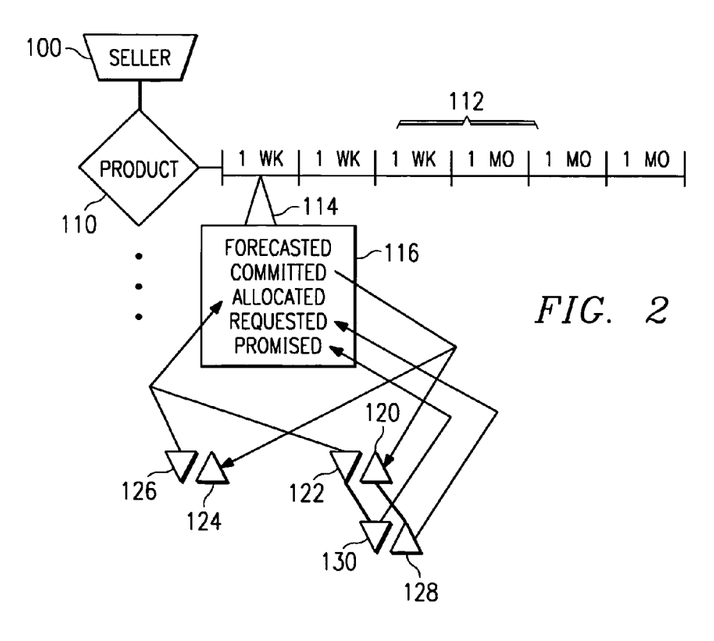
FIG. 2 illustrates one embodiment of a forecast entry for one of several forecast periods for one of several products within a seller.

FIG. 2 illustrates one embodiment of a forecast entry for one of several forecast periods for one of several products within a seller. For each product 110, a forecast horizon 112 is laid out. Forecast horizon 112 can be broken up arbitrarily. In this embodiment, three 1-week periods (the first being 114) are followed by three 1-month periods. For each forecast period for each product, a forecast-entry 116 is generated. The 'forecasted' and 'committed' values can be filled in. The value 'forecasted' is the seller's estimate for how much could be sold of that product 110 during that period. The value 'committed' is the quantity the seller is willing to commit to selling.

The committed quantity results in 'forecast' requests being generated in an amount equal to the committed quantity, spread out through the corresponding forecast period according to a forecast policy specified by the product 110. In the embodiment of FIG. 2, the committed amount results in generation of requests 120 and 124, spaced out in the period 114. The site on which the requests 120 and 124 were placed (specified by the product 110) can then issue promises. Assuming promises 122 and 126 are made for requests 120 and 124, respectively, the value of 'allocated' in the forecast entry 116 for period 114 will be the sum total of the promised quantities.

The allocated amount is the summary amount the seller has available to promise customer requests. When customer request 128 arrives to the seller for product 110 during period 114, the seller can take one or both (or part of one or both) promises that it has already received, break them up or combine them to form a promise for the customer request. The forecast requests are simultaneously adjusted down by the amount of the customer request. So, for example, if the committed value of forecast entry 116 was 500 units, the two forecast requests 120 and 124 were for 250 units each, the two promises 122 and 126 were received for 200 units, and the customer request 128 was for 300 units, then the two forecast requests 120 and 124 will be adjusted to a total of 200 (i.e., 200 and 0 or 100 and 100 or some other combination, dependent upon the product's forecast policy). The two promises 122 and 126 will be adjusted to a total of 100, and a new promise 130 will be created for 300 units to satisfy request 128. The 'committed' and 'allocated' values of forecast entry 116 do not change as a result, but the 'requested' and 'promised' values do. When 'promised' is equal to 'allocated', then there are no more promises available for promising customer requests.

This process is also depicted in the supply chain model example of FIG. 1. In FIG. 1, seller 50 generates forecast request 52 on site 22 for delivery to site 30 (which need not be a physical site). Request 52 results in site 22 generating operation 56 to perform the activity involved in delivering the requested items to site 30. If operation 56 is feasible to perform, then site 22 may choose to create promise 54 to seller 50 that the item can be delivered as requested by request 52.

Site 34 then places request 62 through seller 50 for the same product as request 52. If that customer request 62 is consistent with what seller 50 was forecasting, then seller 50 can reduce request 52, promise 54, and operation 56 by the amount of request 62, and then add promise 64 and operation 66 to fulfill request 62. That simple action did not require replanning through site 22. Effectively, the ability of site 22 to satisfy request 62 had been pre-computed in the form of promise 54. Thus, that promise 54 can be split in order to form promise 64.

A primary caveat is that the load and times of the operation 56 may not be valid when split into operation 66. For example, if operation 56 involved using a truck to transport the items, then splitting out operation 66 may result in an additional truck being used. If none was available, then operation 66 may have to wait. To compensate for this, each product defines criteria for splitting promises, which can include an amount of time with which to pad the due dates quoted.

Of the site models that make up a supply chain model (as in FIG. 1), some of the sites can be under the control of that supply chain model, while others can be modeling sites which are planned independently. A field of the site model called 'managed' indicates which sites are managed by this supply chain model and which are not. Two sites that are both managed do not need to make formal promises between each other—the request will generate an operation and all changes to the requests are immediately passed through the operation to the other site. Requests between a managed Site and an unmanaged site require formal promises. The promises must be made explicitly, and once accepted constitute a rigid agreement between two Sites. Changing that agreement requires both sites' consensus.

Adjustment as Time Passes

Forecasts are often, by their nature, wrong. Thus, as time passes and customer requests arrive faster or slower than expected, it is desirable to modify the forecasts as appropriate. Given a large number of products and numerous forecast periods, automated adjustment is highly desirable.

Thus, the product forecast policy can specify how the forecasted and committed quantities should be adjusted as time passes and actual Requests are received or not.

Figure 3:
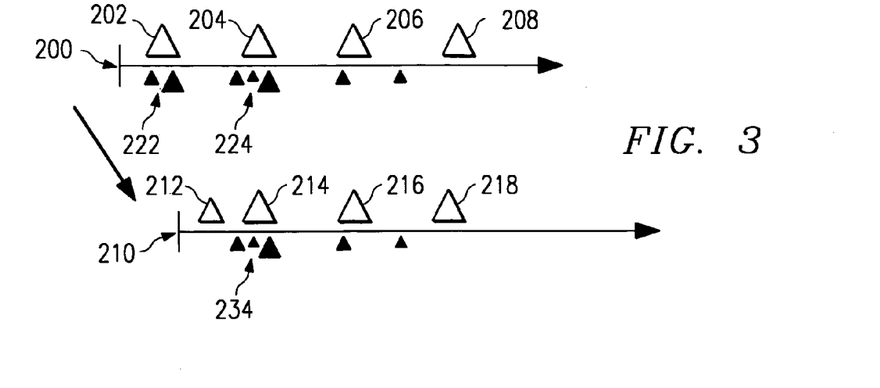
FIG. 3 illustrates one embodiment of a time horizon with forecast requests and actual requests showing the time horizon moving as time passes and the forecast requests adjusting in response.

FIG. 3 illustrates one embodiment of a time horizon with forecast requests and actual requests showing the time horizon moving as time passes and the forecast requests adjusting in response. The timeline 200 represents the initial state. Forecast requests 202, 204, 206, and 208 have been made in their respective forecast periods. Customer requests are indicated with triangles, as shown. The two customer requests 222 correspond to forecast request 202. The three customer requests 224 correspond to forecast request 204.

Time passes and no more requests are received. The timeline 210 represents that later state. Time has advanced beyond the forecast period of the forecast request 202. The customer requests 222 received during that period were less than that forecast request. One option is to assume the forecast was too high and simply expire the leftover forecast. Another option is to assume the forecast quantity is right, but that the timing is off—that the total quantity will be requested soon. In the latter case, the forecast request should be moved forward in time and reduced in quantity. This is shown as forecast request 212. There are many other options for how to expire, reduce, or increase forecast requests based on the arrival rate of customer requests that can be encoded in the product's forecast policy.

Allocation to Sellers

Figure 4:
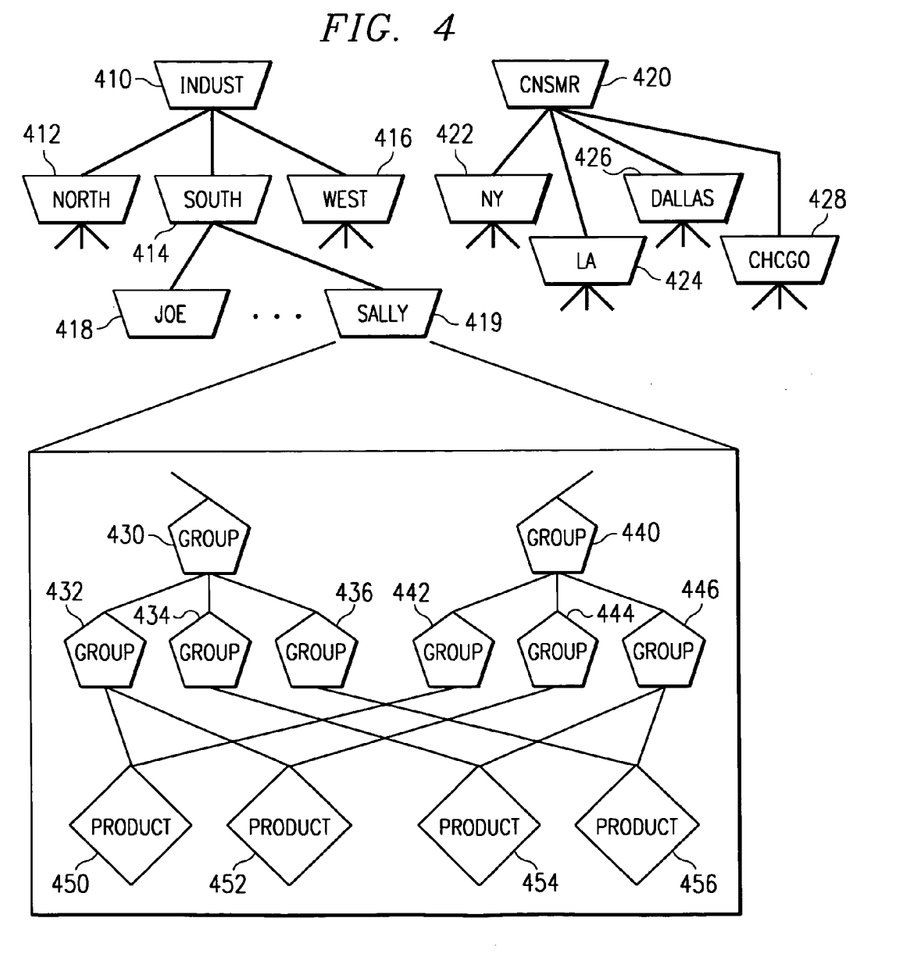
FIG. 4 illustrates one embodiment of a seller model hierarchy and a product group hierarchy within a seller.

FIG. 4 illustrates one embodiment of a seller model hierarchy and a product group hierarchy within a seller. FIG. 4 shows two Seller hierarchies. Seller 410 represents an Industrial Products marketing division, and seller 420 represents a Consumer Products marketing division. Within Industrial Products 410, there are three sales offices that each handle a region: the North is handled by seller 412; the South is handled by seller 414; the West is handled by seller 416. Each sales office is made up of numerous sales people, who are each represented by a seller (for example, Joe is seller 418 and Sally is seller 419).

In many organizations, the sellers may own their own allocations against which they can promise to their customers without consulting the company. However, sellers need not own any allocations. For example, Joe 418 and Sally 419, along with the other sellers in the South sales office 414, may each forecast what they intend to sell. Those forecasts are aggregated up to the sales office seller 414, where they are used as an input. The seller 414 can independently forecast for the whole sales office. That, in turn, is allocated up to the Industrial Products 410 division.

Clearly, forecast requests should not be generated for the forecasts at all three levels—that would result in triple the requests appropriate.

Instead, each seller can independently commit to selling some or all of the forecast. By committing, forecast requests are created in order to obtain promises which can be used to promise their customers. Those promises are owned by (or controlled by) that seller that committed to selling that amount.

However, it may be that some sellers do not commit at all. For example, none of the salespeople, including Joe 418 and Sally 419 commit to any of the forecast. Instead, the South sales office 414 commits as a whole. That results in allocations to the South Seller 414. Those allocations can be used by any of the sub-sellers, such as Joe 418 and Sally 419. However, such collective usage of the allocations requires coordination. They must reserve the amount they need before they can actually promise it, since the other sales people may be considering using the same allocations.

A seller is committed to anything its sub-sellers commit to. However, a seller can commit to additional, beyond what the sub-sellers commit to. For instance, each sales person may make a conservative commitment. The sales office will know that some of the sales people will surely sell over their commitment, but it is not clear which sales people. So the sales office can commit to sell additional, and those additional allocations will be available to the first sales people who exceed their personal allocation.

Product Groups

Forecasts tend to be more accurate in aggregate. A monthly forecast will generally be more accurate than a weekly forecast. A forecast for North America will generally be more accurate than a forecast for Texas. Similarly, a forecast for milk will generally be more accurate than for skim milk in pint containers.

Thus, it is important to be able to aggregate up forecasts, modify the aggregated forecasts, and propagate the changes back down to the individual products. The product group model supports this functionality.

Product groups form hierarchies. A product group can have at most one parent product group, and thus can be in at most one product group hierarchy.

Products, on the other hand, can appear in numerous product groups; however, only in one product group of any one hierarchy. A product group defines one consistent hierarchy for aggregation. However, sellers will need to aggregate the products in many different ways. For example, milk products can be aggregated by their container size (gallon, half gallon, quart, pint), by their fat content (whole, 2%, 1%, skim), by the customer grouping (grocery-store, restaurant, convenience-store), or by brand (ECONO-COW, PUREWHITE).

product groups are depicted in FIG. 4. Products 450, 452, 454, and 456 are grouped into two product group hierarchies, rooted at product groups 430 and 440. Product group 430 is broken down into product groups 432, 434, and 436.

Advanced Available-to-Promise (ATP)

Each seller has allocation (promises) available for the various products sold. When a customer request comes in to a seller, there may be numerous products that match the request. If the lowest cost product can fully satisfy the request (has sufficient quantity by the requested due date), then the request can simply be promised. Otherwise, a decision may be needed. For example, the customer may be able to choose to have it for a low price but a week later than requested, or by the date requested but 10% higher price. It may be that half the order can be completed on time at the lowest price, but the other half can either be delivered later or for a higher price, and so on. Thus, the ATP can be a list of different products (pricings) with different order lead times, minimum quantities, availability dates, and availability quantities.

Extensible Product Model

The product model type has a forecast policy extension selector that allows additional fields and semantics to be added to a product model. Extension selectors are described in more detail in U.S. Pat. No. 5,764,543, issued Jun. 9, 1998, and entitled EXTENSIBLE MODEL NETWORK REPRESENTATION SYSTEM FOR PROCESS PLANNING, the disclosure of which has been incorporated herein by reference.

In this way, additional forecast information such as forecast error or forecasted variance in either quantity or time or both can be input and used. Additional fields for expected skew during the month can affect how the committed quantity is split out into forecast requests. The expected variance or order arrival rates can affect how forecast requests expire or adjust as time passes, based on the customer requests that have been received.

Although the present invention has been described in detail, it should be understood that various changes substitutions and alternations can be made hereto without departing from the spirit and scope of the invention as defined by the appended claims.

What is claimed is:

1. A computer-implemented system for managing data associated with available-to-promise (ATP) products, comprising:
    a memory storing a hierarchy of seller models, each seller model representing a seller of a product, the seller being within a hierarchy of sellers, wherein:
        the hierarchy of sellers comprises at least one parent seller and at least two sub-sellers associated with the parent seller, and
        the parent seller forecasts sales of the product; and
    a processor coupled with the memory, wherein the processor:
        computes an amount of the product that is ATP at each seller according to, at least, planned supply of the product, one or more customer orders for the product through each seller, a pre-allocated supply of the product to each seller, and an amount of the product that is ATP at one or more other sellers within the hierarchy of sellers;
        adjusts the pre-allocated supply of the product to each seller according to customer orders across a time horizon and recomputes the amount of the product that is ATP at each seller according to the adjusted pre-allocated supply.

2. The system of claim 1, wherein the processor further adjusts the pre-allocated supply of the product to each seller according to one or more business criteria selected from the group consisting of seller criteria, product criteria, forecast criteria, supply criteria, customer order criteria, and policy criteria.

3. The system of claim 1, wherein the processor further:
    communicates product forecast models to a remote system;
    receives from the remote system a promise computed at the remote system for a customer order requesting a quantity of a product through each seller, the promise computed according to the pre-allocated supply of the product to each seller;

receives from the remote system adjusted product forecast models reflecting the promise; and recomputes the amount of the product that is ATP at each seller.

4. The system of claim 3, wherein:

all product forecast models for one or more sellers are communicated to the remote system; and wherein the processor further:

receives from the remote system the promise also computed according to the amount of the product that is ATP at the one or more other sellers in the hierarchy; and adjusts the amount of the product that is ATP at the one or more other sellers in the hierarchy when the promise exceeds the pre-allocated supply of the product to each seller.

5. The system of claim 1, wherein the product forecast model further represents a quantity of the product each seller has committed to selling and the processor adjusts the pre-allocated supply of the product to each seller according to the committed quantity.

6. The system of claim 1, wherein the processor further:

accepts a customer order requesting a quantity of a product through each seller, and computes a promise for the customer order according to the planned supply and one or more existing customer orders, the promise restricted according to the pre-allocated supply of the product to each seller.

7. The system of claim 1, wherein:

each product forecast model is extensible such that one or more policy rules is associated with the corresponding product;

each policy rule comprises a restriction on either the forecasted sales or the pre-allocated supply of the product to each seller; and either the forecasted sales or the pre-allocated supply of the product to each seller is computed according to the policy rules.

8. The system of claim 1, wherein the processor further adjusts either the forecasted sales or the pre-allocated supply of the product to each seller according to an arrival rate of customer orders for the product through each seller.

9. A computer-implemented system for managing data associated with available-to-promise (ATP) products, comprising:

a memory storing a hierarchy of seller models representing a seller of a plurality of products each product of the plurality of products corresponding to an item having one or more restrictions on its sale, at least two products of the plurality of products corresponding to the same item but with at least one different restriction, the seller being within a hierarchy of sellers, wherein:

the hierarchy of sellers comprises at least one parent seller and at least two sub-sellers associated with the parent seller, and the parent seller forecasts sales of the product; and a processor coupled with the memory, wherein the processor:

computes an amount of the product that is ATP at each seller according to, at least, a planned supply of the product, one or more customer orders for the product through each seller, a pre-allocated supply of the product to each seller, and an amount of the product that is ATP at one or more other sellers within the hierarchy of sellers;

adjusts the pre-allocated supply of the product to each seller according to customer orders across a time horizon and recomputes the amount of the product that is ATP at each seller according to the adjusted pre-allocated supply.

10. The system of claim 9, wherein the restrictions are selected from the group consisting of price restrictions, quantity restrictions, and lead time restrictions.

11. The system of claim 9, wherein the processor further adjusts the pre-allocated supply of the product to each seller according to one or more business criteria selected from the group consisting of seller criteria, product criteria, forecast criteria, supply criteria, customer order criteria, and policy criteria.

12. The system of claim 9, wherein the processor further:

communicates product forecast models to a remote system;

receives from the remote system a promise computed at the remote system for a customer order requesting a quantity of one or more items through each seller, the promise computed according to at least the pre-allocated supply for corresponding products;

receives from the remote system adjusted product forecast models reflecting the promise; and recomputes the amounts of the corresponding products that are ATP at each seller.

13. The system of claim 9, wherein the product forecast model further represents a quantity of corresponding products each seller has committed to selling and the processor adjusts the pre-allocated supply of the product to each seller according to the committed quantity.

14. The system of claim 9, wherein the processor further:

accepts a customer order requesting quantities of one or more items through each seller; and computes a promise for the customer order according to the pre-allocated supply for corresponding products, wherein the promise comprises a plurality of options each with one or more of the restrictions specified for these products.

15. The system of claim 9, wherein:

each product forecast model is extensible such that one or more policy rules is associated with the corresponding product;

each policy rule comprises a restriction on either the forecasted sales or the pre-allocated supply of the product to each seller; and either the forecasted sales or the pre-allocated supply of the product to each seller are computed according to the policy rules.

16. The system of claim 9, wherein the processor further adjusts either the forecasted sales or the pre-allocated supply for one or more products for each seller according to an arrival rate of customer orders for those products through seller.

17. A method for managing data associated with available-to-promise (ATP) products, comprising:

accessing by a computer comprising a memory and a processor, a hierarchy of seller models stored in the memory, each seller model representing a seller of a product, the seller being within a hierarchy of sellers, wherein the hierarchy of sellers comprises at least one parent seller and at least two sub-sellers associated with the parent seller, and the parent seller forecasts sales of the product; and computing by the processor, an amount of the product that is ATP at each seller according to, at least, a planned supply of the product, one or more customer orders for the product through each seller, a pre-allocated supply of the product to each seller, and an amount of the product that is ATP at one or more other sellers within the hierarchy of sellers;

adjusting, by the processor, the pre-allocated supply of the product to each seller according to customer orders across a time horizon and recomputes the amount of the product that is ATP at each seller according to the adjusted pre-allocated supply.

18. The method of claim 17, further comprising adjusting the pre-allocated supply of the product to each seller according to one or more business criteria selected from the group consisting of seller criteria, product criteria, forecast criteria, supply criteria, customer order criteria, and policy criteria.

19. The method of claim 17, further comprising:
communicating product forecast models to a remote system;
receiving a promise computed at the remote system for a customer order requesting a quantity of a product through each seller, the promise having been computed according to the pre-allocated supply of the product to each seller;
receiving from the remote system adjusted product forecast models reflecting the promise; and
recomputing the amount of the product that is ATP at each seller.

20. The method of claim 19:
wherein all product forecast models for one or more sellers are communicated to the remote system;
wherein the promise is computed according to the amount of the product that is ATP at the one or more other sellers in the hierarchy; and
further comprising adjusting the amount of the product that is ATP at the one or more other sellers in the hierarchy when the promise exceeds the pre-allocated supply of the product to each seller.

21. The method of claim 17:
wherein the product forecast model further represents a quantity of the product each seller has committed to selling; and
further comprising adjusting the pre-allocated supply of the product to each seller according to the committed quantity.

22. The method of claim 17, further comprising:
accepting a customer order requesting a quantity of a product through each seller, and computing a promise for the customer order according to the planned supply and one or more existing customer orders, the promise restricted according to the pre-allocated supply of the product to each seller.

23. The method of claim 17, wherein:
each product forecast model is extensible such that one or more policy rules is associated with the corresponding product;
each policy rule comprises a restriction on either the forecasted sales or the pre-allocated supply of the product to each seller; and
either the forecasted sales or the pre-allocated supply of the product to each seller is computed according to the policy rules.

24. The method of claim 17, further comprising adjusting either the forecast values or the pre-allocated supply of the product to each seller according to an arrival rate of customer orders for the product through each seller.

25. A method for managing data associated with available-to-promise (ATP) products, comprising:
accessing by a computer comprising a memory and a processor, a hierarchy of seller models stored in the memory, each seller model representing a seller of a plurality of products each product of the plurality of products corresponding to an item having one or more restrictions on its sale, at least two products of the plurality of products corresponding to the same item but with at least one different restriction the seller being within a hierarchy of sellers, wherein:
the hierarchy of sellers comprises at least one parent seller and at least two sub-sellers associated with the parent seller,
and
the parent seller forecasts sales of the product; and
computing by the processor, an amount of the product that is ATP at each seller according to, at least, a planned supply of the product, one or more customer orders for the product through each seller, a pre-allocated supply of the product to each seller, and an amount of the product that is ATP at one or more other sellers within the hierarchy of sellers;
adjusting, by the processor, the pre-allocated supply of the product to each seller according to customer orders across a time horizon and recomputes the amount of the product that is ATP at each seller according to the adjusted pre-allocated supply.

26. The method of claim 25, wherein the restrictions are selected from the group consisting of price restrictions, quantity restrictions, and lead time restrictions.

27. The method of claim 25, further comprising adjusting the pre-allocated supply of the product to each seller according to one or more business criteria selected from the group consisting of seller criteria, product criteria, forecast criteria, supply criteria, customer order criteria, and policy criteria.

28. The method of claim 25, further comprising:
communicating product forecast models to a remote system;
receiving a promise computed at the remote system for a customer order requesting a quantity of one or more items through each seller, the promise having been computed according to at least the pre-allocated supply for corresponding products;
receiving from the remote system adjusted product forecast models reflecting the promise; and
recomputing the amounts of the corresponding products that are ATP at each seller.

29. The method of claim 25, wherein:
the product forecast model further represents a quantity of corresponding products each seller has committed to selling; and
further comprising adjusting the pre-allocated supply of the product to each seller according to the committed quantity.

30. The method of claim 25, further comprising:
accepting a customer order requesting quantities of one or more items through each seller, and computing a promise for the customer order according to the pre-allocated supply for corresponding products, wherein the promise comprises a plurality of options each with one or more of the restrictions specified for these products.

31. The method of claim 25, wherein:
each product forecast model is extensible such that one or more policy rules is associated with the corresponding product;
each policy rule comprises a restriction on either the forecasted sales or the pre-allocated supply of the product to each seller; and either the forecasted sales or the pre-allocated supply of the product to each seller is computed according to the policy rules.

32. The method of claim 25, further comprising adjusting either the forecasted sales or the pre-allocated supply for one or more products for each seller according to an arrival rate of customer orders for those products through each seller.

* * * * *